US011150698B2

(12) United States Patent
Wood, III et al.

(10) Patent No.: US 11,150,698 B2
(45) Date of Patent: Oct. 19, 2021

(54) BYPASS PATHWAY FOR PROVIDING AUXILIARY POWER FROM A DOCKING STATION

(71) Applicant: Dell Products, L.P., Round Rock, TX (US)

(72) Inventors: Merle Jackson Wood, III, Round Rock, TX (US); Marcin M. Nowak, Round Rock, TX (US)

(73) Assignee: Dell Products, L.P., Round Rock, TX (US)

( * ) Notice: Subject to any disclaimer, the term of this patent is extended or adjusted under 35 U.S.C. 154(b) by 0 days.

(21) Appl. No.: 16/400,167

(22) Filed: May 1, 2019

(65) Prior Publication Data
US 2020/0348723 A1 Nov. 5, 2020

(51) Int. Cl.
*G06F 1/16* (2006.01)
*G06F 13/38* (2006.01)
*G06F 1/26* (2006.01)

(52) U.S. Cl.
CPC ............ *G06F 1/1632* (2013.01); *G06F 1/263* (2013.01); *G06F 13/385* (2013.01)

(58) Field of Classification Search
CPC ........................................................ G06F 1/16
See application file for complete search history.

(56) References Cited

U.S. PATENT DOCUMENTS

| 6,671,756 | B1* | 12/2003 | Thomas | .................. | G06F 3/023 710/220 |
| 2007/0132733 | A1* | 6/2007 | Ram | .................. | G06F 3/03544 345/163 |
| 2010/0020475 | A1* | 1/2010 | Spitaels | ............. | H01R 13/6666 361/656 |
| 2016/0231777 | A1* | 8/2016 | DeCamp | ............... | G06F 1/1632 |

* cited by examiner

*Primary Examiner* — Jerry Wu
(74) *Attorney, Agent, or Firm* — Fogarty LLP

(57) ABSTRACT

A docking station according to embodiments provides power to an Information Handling System (IHS) coupled to the docking station. The docking station includes a first power circuit supporting a first power output according to a power delivery protocol limited to a first power level. The docking station also includes a second power circuit supporting a second power output for providing the input power of the docking station to the IHS. A controller of the docking station determines whether the IHS requires power using the power delivery protocol and selects the operation of the first or second power circuit. The docking station may support dual of such selectable power pathways using a docking cable joined from two individual cables, where each cable provides a separate power and/or data coupling. The docking station thus supports powering devices according to a power delivery protocol or using the input power to the docking station.

13 Claims, 5 Drawing Sheets

BYPASS PATHWAY FOR PROVIDING AUXILIARY POWER FROM A DOCKING STATION

FIELD

This disclosure relates generally to Information Handling Systems (IHSs), and more specifically, to powering and charging IHSs.

BACKGROUND

As the value and use of information continues to increase, individuals and businesses seek additional ways to process and store information. One option is an information handling system (IHS). An IHS generally processes, compiles, stores, and/or communicates information or data for business, personal, or other purposes. Because technology and information handling needs and requirements may vary between different applications, IHSs may also vary regarding what information is handled, how the information is handled, how much information is processed, stored, or communicated, and how quickly and efficiently the information may be processed, stored, or communicated. The variations in IHSs allow for IHSs to be general or configured for a specific user or specific use such as financial transaction processing, airline reservations, enterprise data storage, global communications, etc. In addition, IHSs may include a variety of hardware and software components that may be configured to process, store, and communicate information and may include one or more computer systems, data storage systems, and networking systems.

A docking station may be used to support the use of a mobile IHS while at a workstation that is available for use at a fixed location. The docking station may support use of the mobile IHS via external displays and other I/O devices such as speakers, external keyboards and a mouse. In addition, a docking station may be a source of electrical power for a mobile IHS while the mobile IHS is docked. A mobile IHS may utilize the power provided by a docking station for powering the mobile IHS and for recharging the internal batteries of the IHS. In some scenarios, such as at a public workstation, a docking station may support multiple different types of mobile IHSs.

SUMMARY

In various embodiments, a docking station is configured for providing power to a first Information Handling System (IHS) that is coupled to the docking station. The docking station includes: a power input received from an AC power adapter; a first power circuit supporting a first power output for providing the power input to the first IHS according to a power delivery protocol limiting the first power output to a first output power level; a second power circuit supporting a second power output for providing the power input to the first IHS; and a main controller configured to interface with the first IHS to determine whether the IHS requires power delivery according to the power delivery protocol and further configured to select the operation of the first power circuit or the second power circuit for providing power the first IHS. In additional docking station embodiments, the first IHS is coupled to the docking station via a first docking cable and wherein the docking station routes power output from the first power circuit and the second power circuit to the first IHS via the first docking cable. In additional docking station embodiments, the first power circuit comprises a voltage regulator and a first port controller, wherein the main controller is further configured to enable and disable the first power circuit via configuration of the first port controller. In additional docking station embodiments, the second power circuit comprises a pair of load switching transistors, wherein the main controller is further configured to enable and disable the second power circuit via configuration of the pair of load switching transistors. In additional embodiments, the docking station further includes a third power circuit supporting a third power output for providing the power input to the first IHS according to the power delivery protocol limiting the second power output to the first output power level; and a fourth power circuit supporting a fourth power mode output for providing the power input to the first IHS. In additional docking station embodiments, the main controller is further configured to interface with the first IHS to determine whether the first IHS supports dual pathway power delivery and further configured to select the operation of the third power circuit or the fourth power circuit for providing addition power to the first IHS. In additional docking station embodiments, the first IHS is further coupled to the docking station via a second docking cable and wherein the docking station routes power output from the third power circuit and the fourth power circuit to the first IHS via the second docking cable. In additional docking station embodiments, a plug of the first docking cable and a plug of the second docking cable are coupled to form a single docking plug. In additional docking station embodiments, the single docking plug comprises a first connector and a second connector and wherein the first connector and the second connector are received by adjacent docking ports of the first IHS.

In various additional embodiments, a method provides power to a first Information Handling System (IHS) that is coupled to a docking station. The method includes: receiving a power input from an AC power adapter; using a first power circuit supporting a first power output to provide the power input to the first IHS according to a power delivery protocol limiting the first power output to a first output power level; using a second power circuit supporting a second power output to provide the power input to the first IHS; interfacing, by a controller of the docking station, with the first IHS to determine whether the first IHS requires power delivery according to the power delivery protocol; and selecting, by the controller, the operation of the first power circuit or the second power circuit for providing power the first IHS.

In additional method embodiments, the first IHS is coupled to the docking station via a first docking cable and wherein the method further comprises routing power output from the first power circuit and the second power circuit to the first IHS via the first docking cable. In additional method embodiments, the first power circuit comprises a voltage regulator and a first port controller, and wherein the method further includes enabling and disabling the first power circuit via configuration of the first port controller by the controller. In additional method embodiments, the second power circuit comprises a pair of load switching transistors, wherein the method further comprises enabling and disabling the second power circuit via configuration, by the controller, of the pair of load switching transistors. In method embodiments, the method further includes using a third power circuit supporting a third power output to provide the power input to the first IHS or a second IHS according to the power delivery protocol limiting the second power output to the first output power level; and using a fourth power circuit supporting a fourth power mode output to provide the power input to the first IHS or the second IHS. In additional embodiments, the method further includes interfacing, by the controller, with the second IHS to determine whether the second IHS requires power delivery according to the power delivery protocol; and selecting, by the controller, the operation of the third power circuit or the fourth power circuit for providing power the second IHS.

In various additional embodiments, a cable couples a docking station to a first IHS (Information Handling System). The cable includes: a cord comprising, at a first end received by a docking port of the first IHS, a first plug and a second plug; the first plug comprising a first connector for transmitting power and data between the first IHS and the docking station and further comprising a first coupling; and the second plug comprising a second connector for transmitting additional power and additional data between the IHS and the docking station and further comprising a second coupling, wherein the first plug and the second plug are joined to form a single docking plug by mating of the first coupling and the second coupling.

In additional cable embodiments, the first coupling and the second coupling are magnets of opposing polarities. In additional cable embodiments, the first connector and the second connector of the single docking plug are received by adjacent docking ports of the first IHS. In additional cable embodiments, the first connector and the second connector are USB-C connectors received by USB-C ports of the first IHS configured as docking ports. In additional cable embodiments, the single docking plug is separated and the first plug is received by a docking port of the first IHS and the second plug is received by a power port of the second IHS.

BRIEF DESCRIPTION OF THE DRAWINGS

The present invention(s) is/are illustrated by way of example and is/are not limited by the accompanying figures, in which like references indicate similar elements. Elements in the figures are illustrated for simplicity and clarity, and have not necessarily been drawn to scale.

DETAILED DESCRIPTION

For purposes of this disclosure, an Information Handling System (IHS) may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an IHS may be a personal computer (e.g., desktop or laptop), tablet computer, mobile device (e.g., Personal Digital Assistant (PDA) or smart phone), server (e.g., blade server or rack server), a network storage device, or any other suitable device and may vary in size, shape, performance, functionality, and price. An IHS may include Random Access Memory (RAM), one or more processing resources such as a Central Processing Unit (CPU) or hardware or software control logic, Read-Only Memory (ROM), and/or other types of nonvolatile memory. Additional components of an IHS may include one or more disk drives, one or more network ports for communicating with external devices as well as various I/O devices, such as a keyboard, a mouse, touchscreen, and/or a video display. An IHS may also include one or more buses operable to transmit communications between the various hardware components.

As described, an IHS may utilize a docking station in order to access external I/O devices. In addition, a docking station may supply an IHS with electrical power that may be used to power the IHS and to recharge the internal batteries of the IHS. A docking station according to embodiments may support docking, and thus power delivery, for various different types of IHSs. For instance, in some embodiments, a docking station may support power delivery for IHSs conforming to the requirements of a power delivery protocol, such as the USB (Universal Serial Bus) power delivery specification. In such embodiments, a docking station my also support power delivery via a bypass auxiliary power delivery pathway via which certain IHSs may be provided power in excess of the supported power delivery protocol. In addition, a docking station according to embodiments may support dual power delivery pathways that may be used to power a single IHS or to separately power different IHSs. As described in additional detail with regard to the below embodiments, the docking station may provide certain IHSs with auxiliary power via these dual power pathways.

Figure 1:
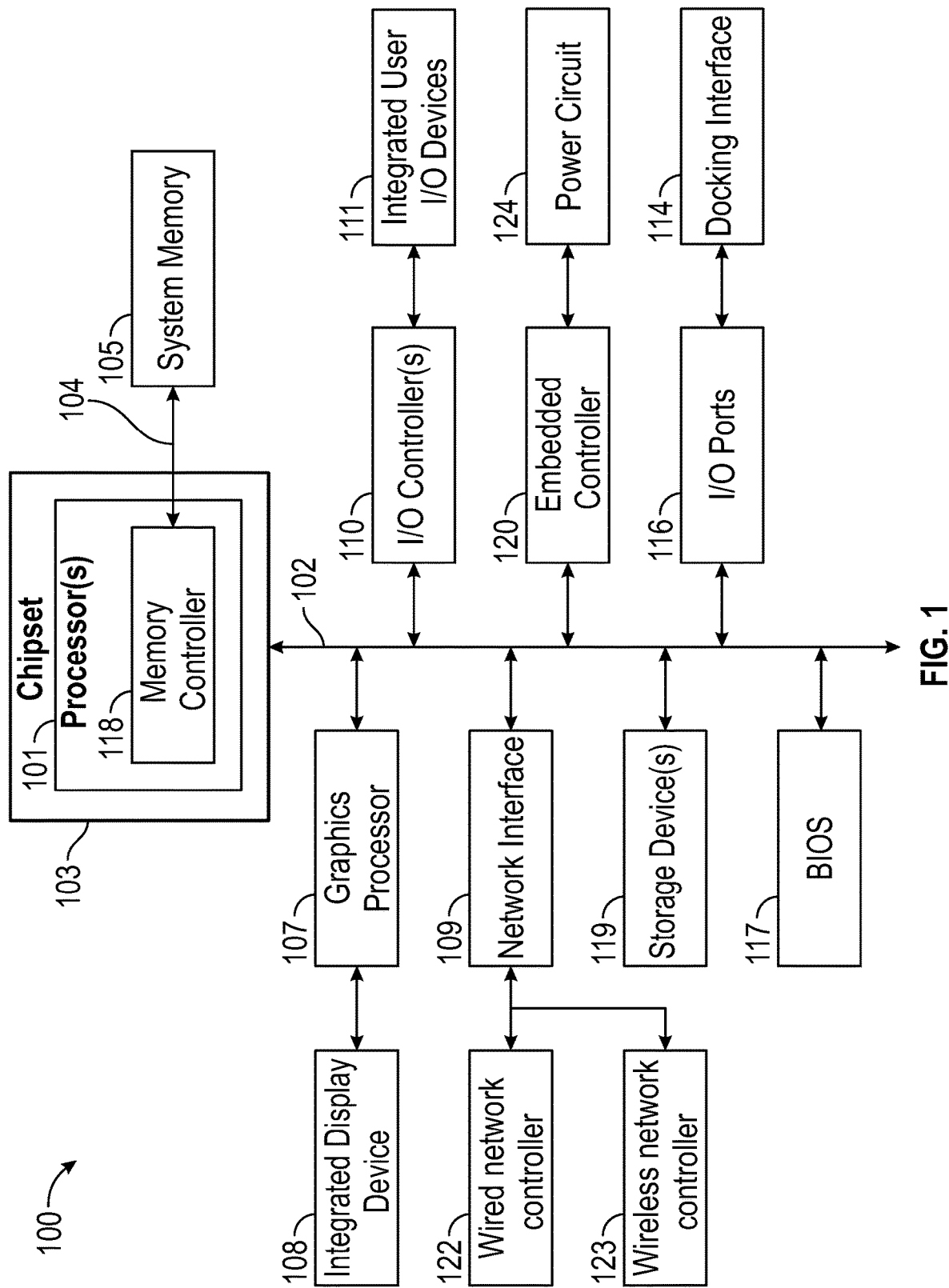
FIG. 1 is a block diagram depicting certain components of an IHS operable according to various embodiments for use with a docking station supporting dual bypass pathways for providing auxiliary power.

FIG. 1 is a block diagram illustrating certain components of an IHS 100 configured according to certain embodiments for use with a docking station supporting dual bypass pathways for providing the IHS 100 with auxiliary power. As described, a mobile IHS may utilize a docking station from which the mobile IHS may receive power and may support various I/O devices, such as external displays, keyboards and mice. In certain embodiments IHS 100 may include a docking interface 114 by which the IHS 100 may receive power, receive inputs from external input devices and transmit outputs to external output devices. In certain embodiments, docking interface 114 may include logic that executes program instructions to perform certain of the operations disclosed herein for interfacing with a docking station supporting dual bypass pathways for providing auxiliary power. While a single IHS 100 is illustrated in FIG. 1, IHS 100 may be a component of an enterprise system that may include any number of additional IHSs that may also be configured in the same or similar manner to IHS 100.

IHS 100 includes one or more processors 101, such as a Central Processing Unit (CPU), that execute code retrieved from a system memory 105. Although IHS 100 is illustrated with a single processor 101, other embodiments may include two or more processors, that may each be configured identically, or to provide specialized processing functions. Processor 101 may include any processor capable of executing program instructions, such as an Intel Pentium™ series processor or any general-purpose or embedded processors implementing any of a variety of Instruction Set Architectures (ISAs), such as the x86, POWERPC®, ARM®, SPARC®, or MIPS® ISAs, or any other suitable ISA.

In the embodiment of FIG. 1, the processor 101 includes an integrated memory controller 118 that may be implemented directly within the circuitry of the processor 101, or the memory controller 118 may be a separate integrated circuit that is located on the same die as the processor 101. The memory controller 118 may be configured to manage the transfer of data to and from the system memory 105 of the IHS 100 via a high-speed memory interface 104.

The system memory 105 that is coupled to processor 101 provides the processor 101 with a high-speed memory that may be used in the execution of computer program instructions by the processor 101. Accordingly, system memory 105 may include memory components, such as such as static RAM (SRAM), dynamic RAM (DRAM), NAND Flash memory, suitable for supporting high-speed memory operations by the processor 101. In certain embodiments, system memory 105 may combine both persistent, non-volatile memory and volatile memory. In certain embodiments, the system memory 105 may be comprised of multiple removable memory modules.

IHS 100 utilizes a chipset 103 that may include one or more integrated circuits that are connect to processor 101. In the embodiment of FIG. 1, processor 101 is depicted as a component of chipset 103. In other embodiments, all of chipset 103, or portions of chipset 103 may be implemented directly within the integrated circuitry of the processor 101. Chipset 103 provides the processor(s) 101 with access to a variety of resources accessible via bus 102. In IHS 100, bus 102 is illustrated as a single element. Various embodiments may utilize any number of buses to provide the illustrated pathways served by bus 102.

As illustrated, a variety of resources may be coupled to the processor(s) 101 of the IHS 100 through the chipset 103. For instance, chipset 103 may be coupled to a network interface 109 that may support different types of network connectivity. In certain embodiments, IHS 100 may include one or more Network Interface Controllers (NIC), each of which may implement the hardware required for communicating via a specific networking technology, such as Wi-Fi, BLUETOOTH, Ethernet and mobile cellular networks (e.g., CDMA, TDMA, LTE). As illustrated, network interface 109 may support network connections by wired network controllers 122 and wireless network controller 123. Each network controller 122, 123 may be coupled via various buses to the chipset 103 of IHS 100 in supporting different types of network connectivity, such as the network connectivity utilized in applications of the operating system of IHS 100.

Chipset 103 may also provide access to one or more integrated display device(s) 108 via graphics processor 107. IHS 100 may also support use of one or more external displays, such as external monitors that may be coupled to IHS 100 via a docking interface 114. In certain embodiments, graphics processor 107 may be comprised within a video or graphics card or within an embedded controller installed within IHS 100. In certain embodiments, graphics processor 107 may be integrated within processor 101, such as a component of a system-on-chip. Graphics processor 107 may generate display information and provide the generated information to an integrated display device 108 coupled to IHS 100 or to an external display accessed via a docking station coupled to IHS 100 via the docking interface 114.

The integrated display devices 108 and any external display devices may utilize LCD, LED, OLED, or other display technologies. In certain embodiments, the integrated display device 108 may be capable of receiving touch inputs such as via a touch controller that may be an embedded component of the display device 108 or graphics processor 107, or may be a separate component of IHS 100 accessed via bus 102. As illustrated, IHS 100 may support an integrated display device 108, such as a display integrated into a laptop, tablet, 2-in-1 convertible device, or mobile device.

Chipset 103 also provides processor 101 with access to one or more storage devices 119. In various embodiments, storage devices 119 may be integral to the IHS 100, or may be external to the IHS 100. In certain embodiments, storage device 119 may be accessed via a storage controller that may be an integrated component of the storage device. Storage device 119 may be implemented using any memory technology allowing IHS 100 to store and retrieve data. For instance, storage device 119 may be a magnetic hard disk storage drive or a solid-state storage drive. In certain embodiments, storage device 119 may be a system of storage devices, such as a cloud drive accessible via network interface 109.

As illustrated, IHS 100 also includes a BIOS (Basic Input/Output System) 117 that may be stored in a non-volatile memory accessible by chipset 103 via bus 102. Upon powering or restarting IHS 100, processor(s) 101 may utilize BIOS 117 instructions to initialize and test hardware components coupled to the IHS 100. The BIOS 117 instructions may also load an operating system for use by the IHS 100. The BIOS 117 provides an abstraction layer that allows the operating system to interface with the hardware components of the IHS 100. The Unified Extensible Firmware Interface (UEFI) was designed as a successor to BIOS. As a result, many modern IHSs utilize UEFI in addition to or instead of a BIOS. As used herein, BIOS is intended to also encompass UEFI.

In certain embodiments, chipset 103 may utilize one or more I/O controllers 110 that may each support hardware components such as integrated user I/O devices 111. For instance, I/O controller 110 may provide access to one or more integrated user I/O devices 111 such as a keyboard, touchpad, touchscreen, microphone, speakers, camera and other input and output devices that may be integrated components of IHS 100. In certain embodiments, additional user I/O devices may be supported via wireless connections supported by a wireless network controller 123 of the IHS 100.

Other components of IHS 100 may include one or more I/O ports 116 the support removeable couplings with various types of peripheral external devices. For instance, I/O 116 ports may include USB (Universal Serial Bus) ports and USB-C ports, by which a variety of external devices may be coupled to IHS 100. I/O ports 116 may include various types of ports and couplings that support connections with external devices and systems, either through temporary couplings via ports, such as USB ports, accessible to a user via the enclosure of the IHS 100, or through more permanent couplings via expansion slots provided via the motherboard or via an expansion card of IHS 100, such as PCIe slots.

In various embodiments, IHS 100 may be coupled to a docking station via an I/O port 116, such as a USB-C port, that may serve as a docking interface 114. Other embodiments may utilize other types of I/O ports as a docking interface for coupling IHS 100 to a docking station. As described, a docking station may provide IHS 100 with power via a docking interface 114. In certain embodiments, the docking interface 114 may also support data transmissions between the IHS 100 and the docking station. In certain embodiments in which the docking interface 114 is a USB-C port, IHS 100 may support power delivery via the docking interface 114 that conforms to the USB power delivery specification. As described below, a docking station according to embodiments may be configured to support power delivery to IHS 100 according to the USB power delivery protocol. However, in certain embodiments, IHS 100 may additionally or alternatively support power delivery that is not provided according to the USB power delivery protocol. Accordingly, the docking station according to embodiments may be further configured to support power delivery to IHS 100 in a manner that bypasses the restrictions of the power delivery protocol and instead provide IHS 100 with the DC input power received from an AC adapter used to power the docking station.

In the illustrated embodiment, IHS 100 also includes a power circuit 124 that receives power inputs used for powering IHS 100 and for charging batteries from which the IHS 100 operates. IHS 100 may include a power port to which an AC adapter may be coupled. As described, IHS 100 may also include a docking interface 114 by which power may be received by IHS 100. For instance, IHS 100 may include a USB-C port that may serve as a docking interface 114 that supports the power delivery from a docking station. In such embodiments, the power received from the docking interface 114 may be provided to the power circuit 124 for powering IHS 100 and charging its batteries.

As described in additional detail below, IHS 100 may also support a docking interface 114 that is comprised of two distinct ports that may be utilized separately or in combination to provide a dual pathway power and data connection with the docking station. For instance, IHS 100 may include two USB-C ports that may each receive USB-C connectors of a docking cable that is used to couple the IHS 100 to the docking station. In such embodiments, the use of the docking interface 114 comprised of dual docking ports allows the docking station to provide IHS 100 with more power than would be possible using a single docking port.

Figure 3:
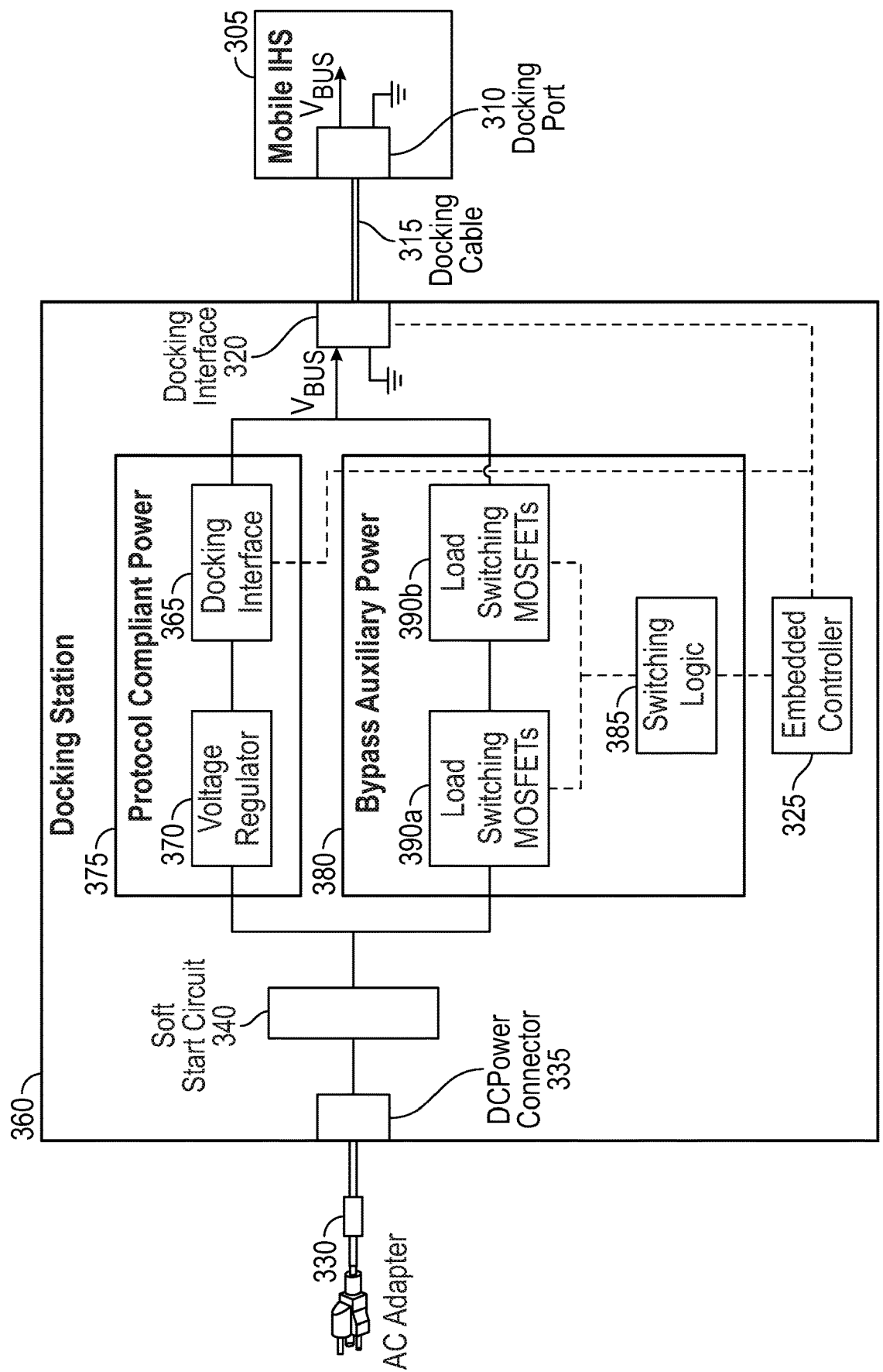
FIG. 3 is a block diagram illustrating certain components of a docking system supporting a bypass pathway for providing auxiliary power to an IHS.
Figure 4:
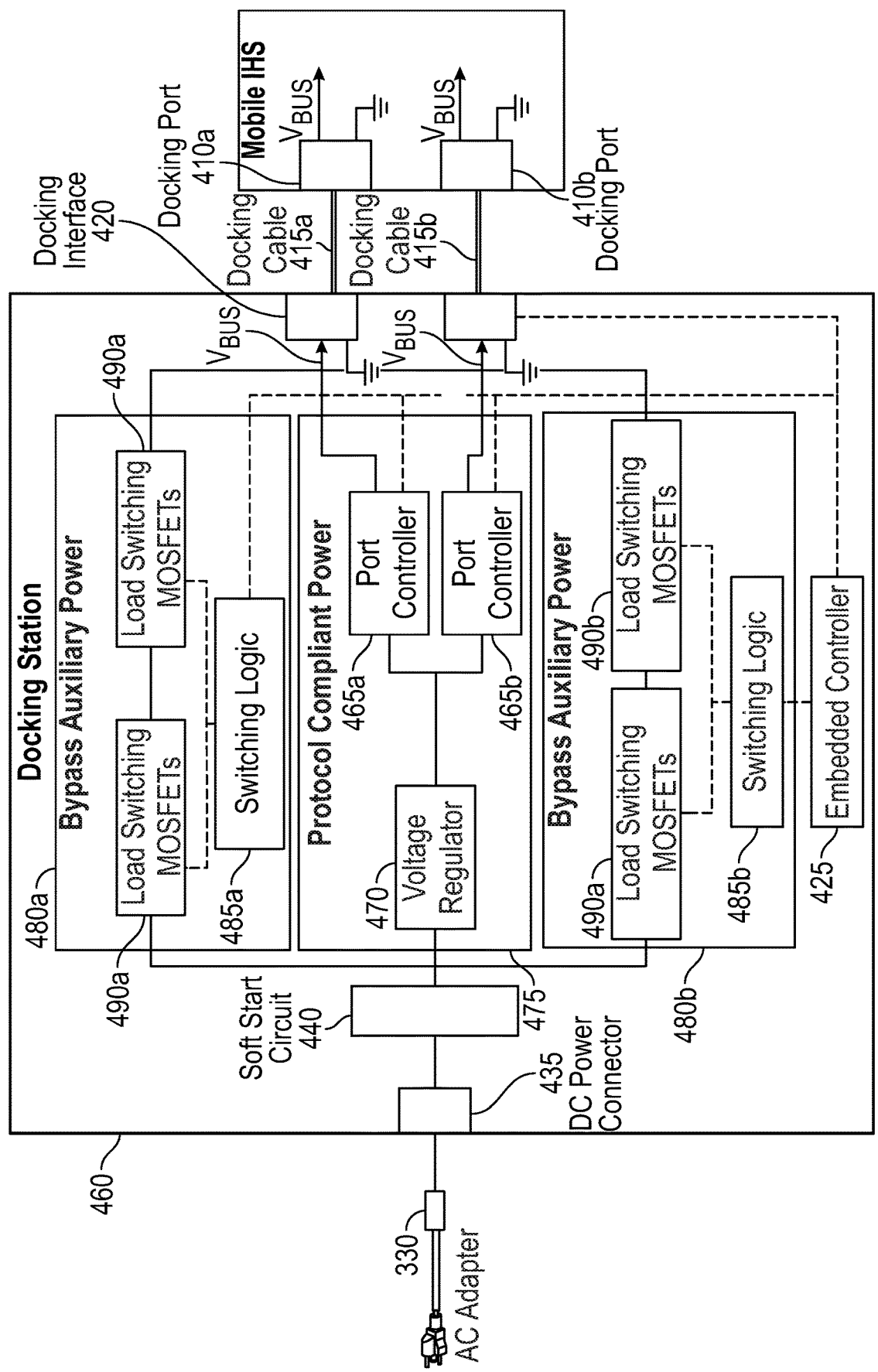
FIG. 4 is a block diagram illustrating certain components of a docking system supporting dual bypass pathways for providing auxiliary power to an IHS.

As described with regard to embodiments of FIGS. 3 and 4, in certain embodiments, the docking interface 114 may support queries that are utilized by the docking station to determine the power delivery and requirements of IHS 100. In such embodiments, docking interface 114 may query the power circuit 124 in order to determine the power transfer configurations that may be supported by the IHS 100. For instance, docking interface 114 may report that IHS 100 requires power delivery according to the USB power delivery specification, or may report that IHS 100 may support power routed directly from a supported AC adapter. Additionally, docking interface 114 may also report whether IHS 100 include support for power delivery via dual power delivery couplings, such as delivery of power via dual USB-C ports.

In various embodiments, an IHS 100 does not include each of the components shown in FIG. 1. In various embodiments, an IHS 100 may include various additional components in addition to those that are shown in FIG. 1. Furthermore, some components that are represented as separate components in FIG. 1 may in certain embodiments instead be integrated with other components. For example, in certain embodiments, all or a portion of the functionality provided by the illustrated components may instead be provided by components integrated into the one or more processor(s) 101 as a systems-on-a-chip.

Figure 2A:
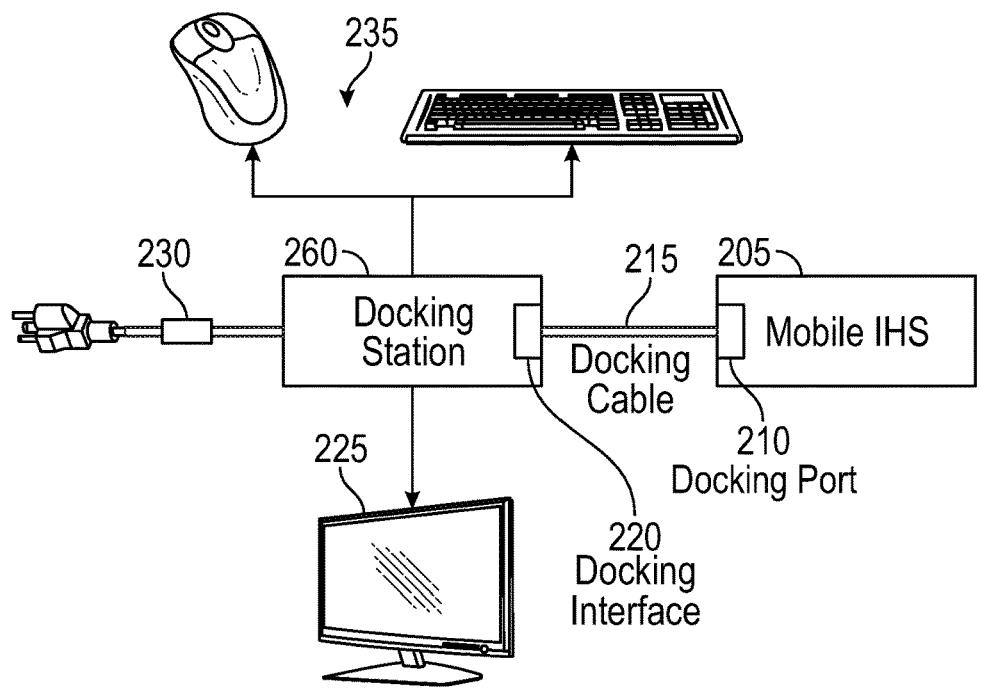
FIG. 2A is a block diagram illustrating certain components of a docking system including a docking station and an IHS.

FIG. 2A is a block diagram illustrating certain components of a docking system that includes a docking station 260 and an IHS 205. In many scenarios, an IHS 205 that utilizes a docking station 260 may be a mobile IHS that may be used at various locations, including at a workstation at which docking station 260 is provided. As illustrated, a docking station 260 may provide a mobile IHS 205 with use of one or more external displays 225. A docking station 260 may also provide use of various user I/O devices 235, such as a mouse and keyboard, which may be coupled to the docking station 260 via wired or wireless connections. While coupled to docking station 260, mobile IHS 205 may be configured such that all user inputs and outputs generated in the operation of the mobile IHS 205 are provided via docking station 260, while some or all of the user input and output capabilities of mobile IHS 205 may be disabled.

As illustrated, a mobile IHS 205 may be coupled to a docking station 260 via a docking cable 215. In certain instances, the docking station 260 includes a docking interface 220 that receives one end of the docking cable 215 and the mobile IHS 205 includes a docking port 210 that receives the other end of the docking cable 215. Other types of docking interfaces require a mobile IHS to be plugged directly to a docking station, such as via mating of an external connector of the mobile IHS with a compatible coupling provided by the docking station. In FIG. 2, a docking cable 215 is used to connect the docking station 260 and the mobile IHS 205.

Also as illustrated, a docking station 260 may be coupled to an AC adapter 230 and by which the docking station 260 receives DC power. The docking station 260 may use the received DC power to provide power to mobile IHS 205. Other types of docking stations may transfer power to an IHS via a direct power coupling or through a dedicated power cord. In the docking station 260 of FIG. 2, the single docking cable 215 is used to transmit both the DC power provided to mobile IHS 205 and the data transmitted between the docking station 260 and the mobile IHS. For instance, a USB-C cable may be utilized to connect the docking station 260 to a USB-C port 210 of the mobile IHS 205. In certain instances, the power that may be provided via a single docking cable 215 may be insufficient to fully power certain mobile IHSs 205.

Figure 2B:
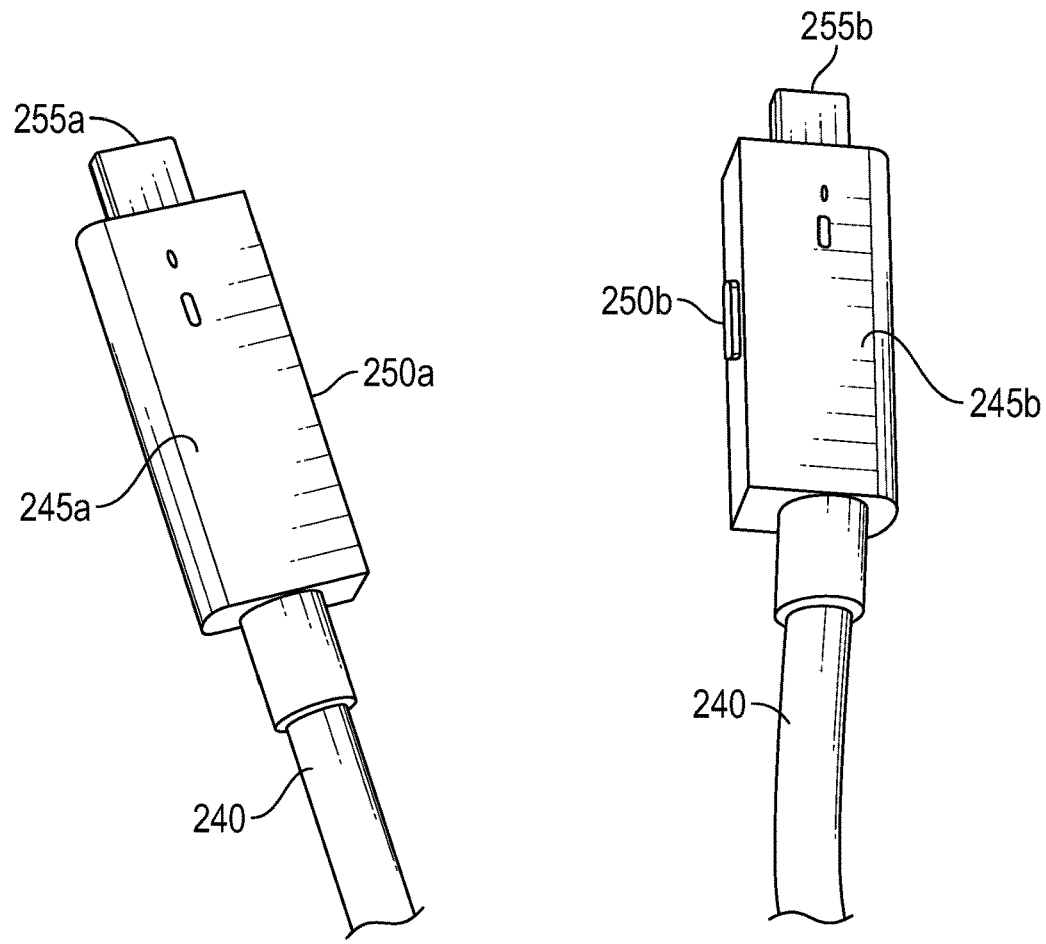
FIG. 2B is an illustration of a first configuration of an embodiment of an IHS docking cable that supports dual power pathways.

FIG. 2B is an illustration of an embodiment of an IHS docking cable 240 that supports dual power pathways for providing power to mobile IHSs that may utilize more power than can be provided via a docking cable that includes a single power pathway. As illustrated, the docking cable 240 may include two branches, each including its own plug 245a and 245b. Although not illustrated, in certain embodiments the two branches of docking cable 240 may be joined to form a single cable for a substantial portion of the length of the power cable. In certain embodiments, both ends of docking cable 240 may be identical and may operate as described with regard to FIGS. 2B-C. In other embodiments, the end of the docking cable 240 that is received by the mobile IHS may operate as described with regard to FIGS. 2B-C and the other end of the docking cable received by the docking station may operate differently.

As illustrated, the docking cable 240 includes two plugs 245a and 245b, each of which provides a power and data coupling between a docking station and a mobile IHS. Each of the plugs 245a and 245b includes a connector 255a and 255b that is received by a compatible docking port of the mobile IHS. In certain embodiments, the connectors 255a and 255b are USB-C connectors that are received by USB-C ports of the docked mobile IHS. In certain embodiments, each of the plugs 245*a* and 245*b* of the docking cable may include magnets 250*a* and 250*b* on corresponding surfaces of the respective plugs 245*a* and 245*b*. Although a single magnet 250*a* and 250*b* is illustrated on each of the plugs 245*a* and 245*b*, certain embodiments may utilize multiple magnets in each of the plugs 245*a* and 245*b*, where the polarity and positioning of each magnet of a plug is selected in order for each magnet to interface with a corresponding magnet on the other plug. In other embodiments, mechanisms other than magnets may be utilized to join individual plugs into a single docking plug. For instance, each plug may include corresponding tongue and groove structures that allow a user to slide the two plugs together until they are temporarily joined to form a single docking plug.

Figure 2C:
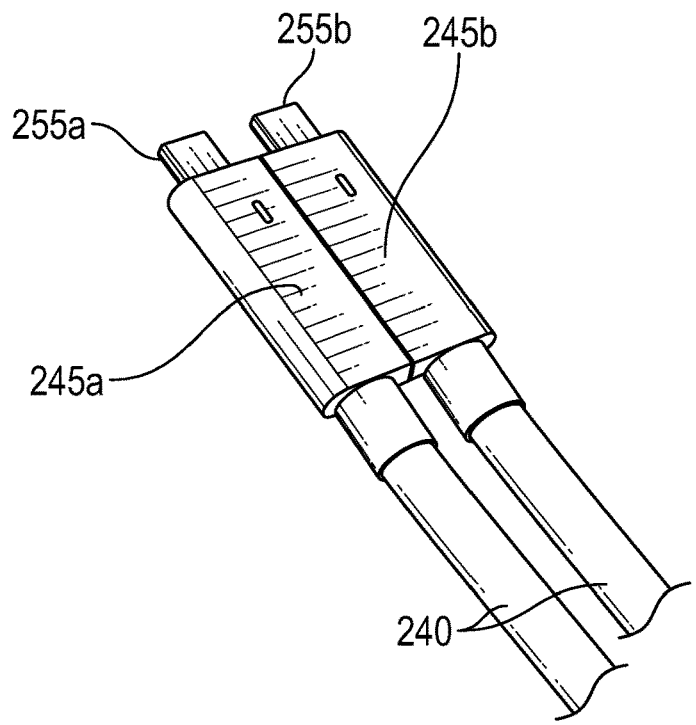
FIG. 2C is an illustration of a second configuration of an embodiment of an IHS docking cable that supports dual power pathways.

FIG. 2C is an illustration of a second configuration of an embodiment of an IHS docking cable 240 that supports dual power pathways. In FIG. 2C, the two branches of the docking cable 240 have been joined to form a single plug that includes two connectors 255*a* and 255*b*. In certain embodiments, each of the two connectors 255*a* and 255*b* may be a USB-C connector. The single docking plug may be formed via the coupling of the corresponding magnets of the individual plugs 245*a* and 245*b*. Join in this manner, the individual plugs 245*a* and 245*b* may be manipulated by the user as a single docking plug, thus freeing the user from having to manage multiple plugs for docking an IHS. Other embodiments may utilize additional or alternative mechanisms than the described magnets for joining the individual plugs 245*a* and 245*b* into a single docking plug.

Figure 2D:
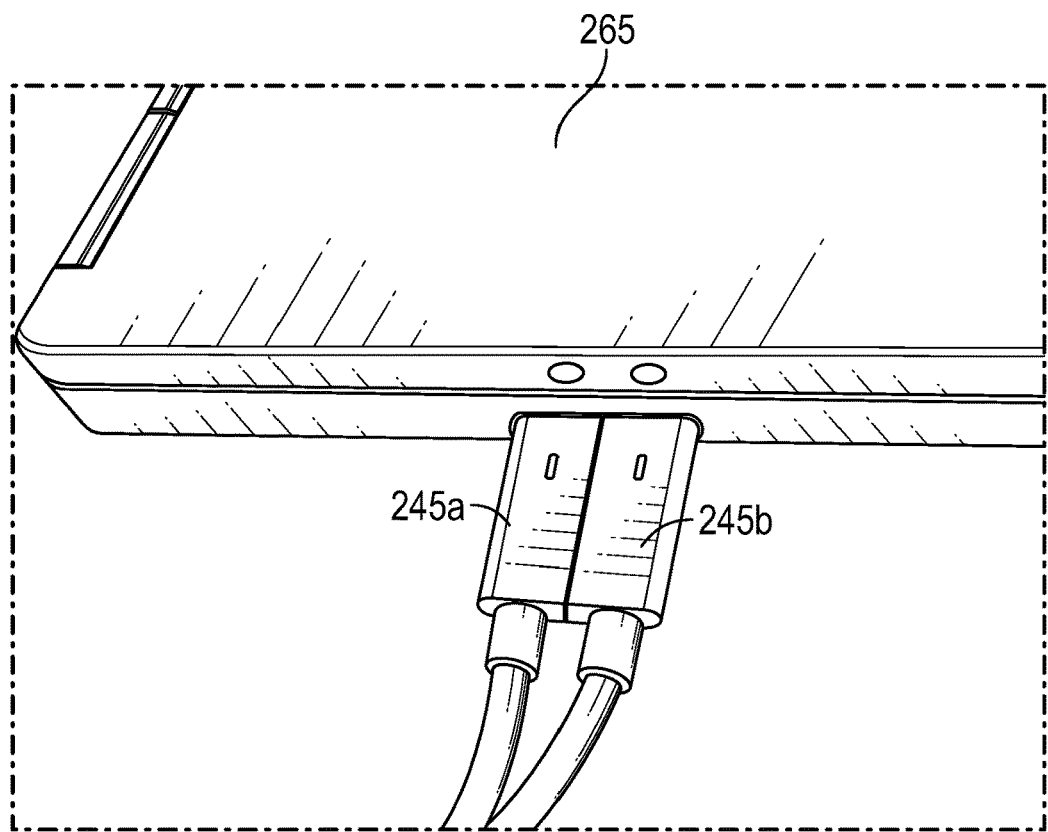
FIG. 2D is an illustration of an embodiment of an IHS docking cable that is coupled to an IHS and provides the IHS with dual power pathways.

FIG. 2D is an illustration of an embodiment of an IHS docking cable 240 that is coupled to an IHS and provides the IHS with dual power pathways. As illustrated, the docking plug formed from joining the individual plugs 245*a* and 245*b* may be received by docking ports supported by the IHS 265. To receive the joined docking plug, the IHS 265 includes two adjacent docking ports that each receive one of the connectors of the joined docking plug. Accordingly, in certain embodiments, the individual plugs 245*a* and 245*b* may designed such that respective connectors of a jointed docking plug are spaced at a distance corresponding to the distance between the adjacent docking ports supported by certain types of IHSs. In certain embodiments, the docking plug may be utilized in non-adjacent ports of an IHS, in which case the individual plugs 245*a* and 245*b* may be separated and each branch of the docking cable may be routed to one of the non-adjacent ports.

Using the docking cable of FIGS. 2B-D, an IHS 265 may receive a single plug that includes two connectors, where each connector provides a separate power and data pathway between the docking station and the IHS. As described in additional detail below, in certain embodiments, a docking station may support dual power pathways via the two connectors 255*a* and 255*b*, where the dual power pathways may provide a docked IHS with a doubling of the power that may be drawn from the docking station via a single power pathway docking cable. In addition, a docking station according to embodiments may support providing auxiliary bypass power via each of the individual connectors 255*a* and 255*b* of the docking plug, thus providing the IHS with additional, auxiliary amounts of power.

FIG. 3 is a block diagram illustrating certain components of a docking system supporting a bypass pathway for providing auxiliary power to a mobile IHS 305 coupled to a docking station 360. In the illustrated embodiment, a mobile IHS 305 may be coupled to a docking station 360 via a single docking cable 315 that is received at one end by a docking port 310 of the IHS and on the other end by a docking interface 320 of the docking station. In certain embodiments, the docking cable 315 may be a USB-C cable that is received by USB-C ports of the mobile IHS 305 and the docking station 360. As described, the docking cable 315 may be used to transfer power from the docking station 360 to the mobile IHS 305 and may be additionally used to transfer data between the docking station 360 and the mobile IHS 305.

In providing power to the mobile IHS 305, the docking station 360 may receive power via an AC adapter 330 that is coupled to a DC power connector 335 supported by the docking station. In certain embodiments, a soft start circuit 340 may be utilized to limit the rate of current flows to the power circuitry of the docking station 360 during startup conditions when input power is being initially received from the AC adapter 330. The input power received from the DC power connector 335 may then be routed via one of two power pathways to the docking interface 320 for use by the coupled mobile IHS 305. As described, the docking cable 315 by which the mobile IHS is coupled to the docking station 360 may be a USB-C cable. Accordingly, the docking station 360 may support power and data transfers that conform to USB specifications, such as the USB 3.1 data transfer specification and the USB power delivery specification. In support of such USB-C power transfers, the docking station 360 may include a protocol compliant power pathway 375 that generates power transfers compliant with the USB power delivery specification.

As illustrated, the protocol compliant power pathway 375 may utilize a voltage regulator 370 that converts the input DC power received from the DC power connector 335 to a voltage supported by a power delivery protocol. For instance, a voltage regulator 370 supporting the USB power delivery specification may be configured to generate industry supported output voltages, such as output voltages of 5V, 9V, 15V and 20V. The output generated by voltage regulator 370 is received by a port controller 365 which is configured to generate the output voltage $V_{BUS}$ at a current that is conforms the power delivery protocol in use by the mobile IHS 305. In compliance with a power delivery protocol such as the USB power delivery specification, the port controller 365 may be limited in the output current that may be provided. For instance, compliance with the USB power delivery specification may restrict the output of port controller 365 to currents that are no more than 5 A or overall power output greater than 100 W. Smaller currents and power output may also be supported, but port controller 365 may include circuitry that prevents transmission at current levels greater than 5 A or power output greater than 100 W. In this manner, docking station 360 may utilize the protocol compliant power pathway to support docking of a mobile IHS 305 that utilizes a specific power delivery protocol, such as the USB power delivery specification.

Certain IHSs may be capable of utilizing power in excess of the power output supported by the power delivery protocol that is supported by the protocol compliant power pathway 375. Accordingly, in addition to supporting power transfers compliant with a protocol such as the USB power delivery specification, docking station 360 may utilize a bypass auxiliary power pathway 380 that may deliver greater power to a mobile IHS 305 than is possible using the power compliant power pathway 375. As illustrated, the bypass auxiliary power pathway 380 may receive DC input power from the DC power connector 335 and may utilize a pair of load switching transistors 390*a* and 390*b* that may be operated by switching logic 385 to provide the DC input power from DC power connector 335 directly to the mobile IHS 305. In this manner, the power compliant power pathway may be used to route power (commonly 240 W of power provided at 19.5V) directly from the AC adapter 330 to the mobile IHS 305.

In certain embodiments, docking station 360 may include an embedded controller 325 that executes instructions that are operable for determining whether the mobile IHS 205 coupled to the docking interface 320 requires power delivery that is compliant with a particular power delivery protocol, or whether the mobile IHS 205 supports auxiliary power that may be provided by bypassing the restrictions of the power delivery protocol. For instance, the embedded controller 325 may detect the coupling of an IHS to docking interface 320. Upon detecting the docking of mobile IHS 305, the embedded controller 325 may exchange messages with the mobile IHS 305 in order to determine the power requirements of the mobile IHS. For instance, the embedded controller 325 may interrogate the power capabilities of the mobile IHS 305 using vendor defined messages supported by the signaling protocol that is used to support the data transmission capabilities of the docking cable 315.

In scenarios where the embedded controller 325 determines that the mobile IHS 305 requires power delivery according to a power delivery protocol supported by the docking station 360, the embedded controller 325 activates the port controller 365 of the protocol compliant power pathway 375. In addition, the embedded controller 325 directs the switching logic 385 of the bypass auxiliary power pathway 380 to configure the load switching transistors 390*a* and 390*b* to prevent current from flowing in either direction along the bypass auxiliary power pathway 380. Based on such configurations directed by the embedded controller 325, the docking station 360 may be used to provide power interchangeably to different types of docked IHSs, where some types of docked IHSs may be provided power according to a power delivery protocol and other types of docked IHSs may be provided auxiliary power directly from the DC power source of the docking station 360.

In addition to providing a pathway for supporting greater power outputs then supported by a power delivery protocol, the bypass auxiliary power pathway 380 provides several advantages in the operation of the docking station 360. In many instances, a voltage regulator 370 may be implemented as a buck-boost voltage regulator that converts an input voltage to a particular output voltage in a manner that dissipates a certain amount of power and generates heat. In comparison, the load switching transistors 390*a* and 390*b* transmit received DC power directly to the mobile IHS 305, thus providing a more efficiently power delivery pathway than is possible via the voltage regulator 370. Due to the increased efficiency provided by the bypass auxiliary power pathway, less heat is generated. As a result, docking station 360 may operate with decreased cooling requirements, thus allowing for slower fan speeds and less fan noise when compared to power delivery using the power compliant power pathway.

Besides providing increased efficiency compared to the protocol compliant power pathway 375, the bypass auxiliary power pathway 380 may also be used to support greater peak currents than are supported by the protocol compliant power pathway 375. As described, in instances where the power compliant power pathway 375 provides power outputs according to the USB power delivery specification, output currents may be limited to 5 A. Even when unrestricted by a power delivery protocol, the circuitry required to implement the power compliant power pathway 375 serves to limit the peak currents that can be provided using this pathway. Accordingly, the bypass auxiliary power pathway 380 may be used to deliver greater peak currents than possible via a power compliant power delivery pathway. Upon the embedded controller 325 determining that the docked mobile IHS 305 supports delivery of power directly from the DC power source of the docking station 360, the embedded controller 325 may configure the switching logic 385 to operate the load switching transistors 390*a* and 390*b* to allow for bypass auxiliary power delivery, thus proving mobile IHS 305 with a power supply that supports greater peak currents that are supported by the power compliant power pathway.

FIG. 4 is a block diagram illustrating certain components of a docking system supporting dual bypass pathways that are each capable of providing auxiliary power to a mobile IHS 405. As described with regard to the dual-connector docking plug of FIGS. 2B-D, a docking cable according to embodiments may consist of two separate cables 415*a* and 415*b*, each of which may support both data and power transmissions. As described with regard to FIG. 1, an IHS may include dual ports that support docking. In this manner, the mobile IHS 405 includes two docking ports 410*a* and 410*b*. In certain embodiments, each of the docking ports 410*a* and 410*b* may be USB-C ports that receive USB-C connectors of the respective docking cables 415*a* and 415*b*.

In certain embodiments, the docking ports 410*a* and 410*b* may be located adjacent to each and may thus be compatible with the joined docking plug of FIGS. 2B-D. In other embodiments, docking ports 410*a* and 410*b* may be positioned at nonadjacent locations of mobile IHS 405, such as on opposite sides of mobile IHS 405. In other embodiments, docking ports 410*a* and 410*b* may be located on different IHSs, in which case the docking station 460 may provide power to two different IHSs via separate docking cables 415*a* and 415*b*.

As with the docking station of FIG. 3, the docking station 460 receive DC power from an AC adapter 430 at a DC power connector 435. The docking station 460 also includes a soft start circuit 340 that may limit current flows to the power circuitry of the docking station 360 during startup conditions. As illustrated, the docking station 460 of FIG. 4 includes two bypass auxiliary pathways 480*a* and 480*b*. As with the docking station of FIG. 3, the embedded controller 425 of docking station 460 may utilize vendor defined messages transmitted via docking cables 415*a* and/or 415*b* in order to determine the power capabilities of the mobile IHS 405. In certain scenarios, the interrogation by embedded controller 425 may determine that docking cables 415*a* and 415*b* are coupled to different IHSs, in which case the embedded controller 425 may interrogate each of the IHSs in order to determine their respective power delivery capabilities. Based upon the interrogation by the embedded controller 425, one or both of the bypass auxiliary pathways 480*a* and 480*b* may be activated.

If one or both of the bypass auxiliary pathways 480*a* and/or 480*b* is activated, the embedded controller 425 also disables the power port controllers 465*a* and/or 465*b* of the corresponding protocol compliant pathway 475 that is being bypassed. For instance, if the interrogation messages transmitted by the embedded controller 425 via the docking cables 415*a* and 415*b* indicate that both docking cables are coupled to the same mobile IHS and the mobile IHS is support auxiliary power transfers, both power port controllers 465*a* and 465*b* may be disabled, thus preventing flow of current in either direction via these power port controllers. In another scenario, if the interrogation messages transmitted by the embedded controller 425 indicate that docking cable 415a is coupled to a docking port 410a that requires USB compliant power delivery and docking cable 415b is coupled to a docking port 410b that supports auxiliary power transfers, the embedded controller 425 may disable bypass auxiliary pathway 480a and also disable power port controller 465b. Configured in this manner, the docking station thus supports one protocol compliant power delivery pathway and one bypass auxiliary power delivery pathway. In some instances, the power delivery pathways may support docking by one IHS or contemporaneous docking by two separate IHSs.

In certain scenarios, the interrogation by embedded controller 425 may indicate that the mobile IHS 405 is configured to receive power according to a power delivery protocol supported by the docking station and does not support auxiliary power in excess of the limits specified by the power delivery protocol. In such instances, the embedded controller 425 disables both of the bypass auxiliary pathways 480a and 480b. As described with regard to FIG. 3, the embedded controller 425 may disable a bypass auxiliary pathway 480a and/or 480b by directing the respective switching logic 485a and/or 485b to configure the operation of the load switching transistors 490a and/or 490b to prevent the flow of current in either direction along the disabled bypass pathways. By disabling an auxiliary bypass pathway 480a or 480b, power is provided to the respective docking cable 415a or 415b via the protocol compliant power pathway 475.

As illustrated, the protocol compliant power pathway 475 may include a single voltage regulator 470 that supports regulated voltage outputs by each of the power port controllers 465a and 465b. Based on the configuration by the embedded controller 425, the power port controllers 465a and 465b may be individually enabled or disabled. As with the embodiment of FIG. 3, in scenarios where embedded controller 425 determines that the mobile IHS 405 requires power inputs according to a power delivery protocol, such as the USB power delivery specification, the embedded controller 425 may configure one or both of the power port controllers 465a and/or 465b to provide power to the mobile IHS 405 via a power delivery protocol supported by the protocol compliant power delivery pathway 475.

As described, certain IHSs may support power inputs in excess of those that may be provided according to the power delivery protocol supported by the protocol compliant power delivery pathway 475. Accordingly, upon determining the mobile IHS 405 supports such auxiliary power delivery, the embedded controller 425 may enable one or both of the bypass auxiliary power pathways 480a and/or 480b. In scenarios where both bypass auxiliary pathways 480a and 480b are enabled, each bypass pathway delivers input DC power received by the DC power connector 435 of the docking station 460 directly to the mobile IHS. Configured in this manner, each of the docking cables 415a and 415b provide mobile IHS with a separate source of DC power.

As described with regard to FIGS. 2B-D, a single docking cable may be formed by joining two separate plugs such that the single docking cable includes two separate connectors that may be received by adjacent docking ports 410a and 410b of the mobile IHS 405. In certain embodiments, such dual docking cables may be dual USB-C docking cables. In scenarios where a dual USB-C docking cable 415a and 415b is utilized and bypass auxiliary power pathways have been configured for each docking cable, docking station 460 may provide IHS 405 with over 100 W via each of the dual USB-C docking cables 415a and 415b. In such a configuration, the combined average power delivered to mobile IHS 405 is thus greater than 200 W, with delivery of peak power up to approximately 400 W. This allows for docking of an IHS 405 use of a single docking plug, rather than docking the IHS 405 using a USB-C connector for data transmissions and a separate powering the IHS 405 using an AC adapter.

As described with regard to FIG. 3, the minimal circuitry required to implement the bypass auxiliary power pathways provides for a more efficient operation of the docking station compared to the use of the power compliant power pathway. In scenarios, such as the docking station 460 of FIG. 4, that utilize dual power delivery pathways, the minimal circuitry required to implement the bypass auxiliary power pathways allows for easier impedance matching of the alternate pathways when compared to the power compliant power pathways. For instance, slight differences in impedance of the power port controllers 465a and 465b may result in large imbalances of current flow when both power port controllers 465a and 465b are enabled. Conversely, the relative simplicity of load switching transistors utilized in the bypass auxiliary power pathways 480a and 480b can be expected to result in smaller impedance mismatches between the two bypass auxiliary power pathways 480a and 480b. Accordingly, more balanced flow of current may be observed when both bypass auxiliary power pathways 480a and 480b are enabled.

As described, the embedded controller 425 of the docking station 460 may be utilized to determine the power delivery requirements of each of the docking ports 410a and 410b of the mobile IHS 405. In various scenarios, the embedded controller 425 may determine that an IHS 405 supports docking using dual power pathways, in which case docking cable connectors are received at two power ports 410a and 410b of the mobile IHS 405. In USB-C embodiments, each of the dual power pathways also supports data transmissions between the mobile IHS 405 and the docking station 460, where the data transmissions are used to support the docking functions other than power, such as the use of external displays and other I/O devices. Accordingly, in scenarios where dual power delivery pathways are being utilized, the embedded controller 425 may be configured to support a data connection used for docking functions other than power to a single docking cable.

In scenarios in which dual power pathways are enabled, a docking station may restrict docking functions other than power to a single docking cable, but may still support power delivery to additionally IHSs. For instance, in certain embodiments, docking may be supported for a first IHS via a first docking cable and power delivery may be supported for a second IHS via a second docking cable. In certain embodiments, power delivery by the docking station for separate IHSs may be supported using two separate docking cables or using the docking cable of FIGS. 2B-D with the docking plug split into two separate plugs that are coupled to different IHSs.

In scenarios in which dual power delivery pathways are enabled, disconnection of one of the docking cables may indicate the need to reconfigure the still connected docking cable. For instance, embedded controller 425 may renegotiate the power delivery provided to each of the docking ports 410a and 410b upon detecting a disconnection of one of the docking cables 415a or 415b. In one example, if docking cable 415a was configured for use in data transmission supporting non-power docking functions and is subsequently disconnected, embedded controller 425 may reconfigure docking cable 415b for use in supporting both power and data docking functions, albeit at a lower power than previously provided using the dual power pathway connection.

It should be understood that various operations described herein may be implemented in software executed by processing circuitry, hardware, or a combination thereof. The order in which each operation of a given method is performed may be changed, and various operations may be added, reordered, combined, omitted, modified, etc. It is intended that the invention(s) described herein embrace all such modifications and changes and, accordingly, the above description should be regarded in an illustrative rather than a restrictive sense.

The terms "tangible" and "non-transitory," as used herein, are intended to describe a computer-readable storage medium (or "memory") excluding propagating electromagnetic signals; but are not intended to otherwise limit the type of physical computer-readable storage device that is encompassed by the phrase computer-readable medium or memory. For instance, the terms "non-transitory computer readable medium" or "tangible memory" are intended to encompass types of storage devices that do not necessarily store information permanently, including, for example, RAM. Program instructions and data stored on a tangible computer-accessible storage medium in non-transitory form may afterwards be transmitted by transmission media or signals such as electrical, electromagnetic, or digital signals, which may be conveyed via a communication medium such as a network and/or a wireless link.

Although the invention(s) is/are described herein with reference to specific embodiments, various modifications and changes can be made without departing from the scope of the present invention(s), as set forth in the claims below. Accordingly, the specification and figures are to be regarded in an illustrative rather than a restrictive sense, and all such modifications are intended to be included within the scope of the present invention(s). Any benefits, advantages, or solutions to problems that are described herein with regard to specific embodiments are not intended to be construed as a critical, required, or essential feature or element of any or all the claims.

Unless stated otherwise, terms such as "first" and "second" are used to arbitrarily distinguish between the elements such terms describe. Thus, these terms are not necessarily intended to indicate temporal or other prioritization of such elements. The terms "coupled" or "operably coupled" are defined as connected, although not necessarily directly, and not necessarily mechanically. The terms "a" and "an" are defined as one or more unless stated otherwise. The terms "comprise" (and any form of comprise, such as "comprises" and "comprising"), "have" (and any form of have, such as "has" and "having"), "include" (and any form of include, such as "includes" and "including") and "contain" (and any form of contain, such as "contains" and "containing") are open-ended linking verbs. As a result, a system, device, or apparatus that "comprises," "has," "includes" or "contains" one or more elements possesses those one or more elements but is not limited to possessing only those one or more elements. Similarly, a method or process that "comprises," "has," "includes" or "contains" one or more operations possesses those one or more operations but is not limited to possessing only those one or more operations.

The invention claimed is:

1. A docking station configured for providing power, the docking station comprising:

a DC power connector that receives a power input from an AC power adapter, wherein the DC power connector is coupled to a first power circuit and a second power circuit;

the first power circuit receiving power from the DC power connector and providing a first power output to a laptop computer coupled to the docking station;

the second power circuit receiving power from the DC power connector and providing a second power output to the coupled laptop computer; and a main controller configured to deliver power using the first power circuit and the second power circuit; wherein the laptop computer is coupled to the docking station via a first and second docking cables and wherein the docking station routes power from the first power circuit to the laptop computer via the first docking cable and routes power from the second power circuit to the laptop computer via the second docking cable and wherein first docking cable and the second docking cable are received by adjacent ports of the laptop computer.

2. The docking station of claim 1, wherein the laptop computer is simultaneously coupled to the docking station via the first docking cable and the second docking cable.

3. The docking station of claim 2, wherein the simultaneous delivery of power by the first power circuit via the first docking cable and by the second power circuit via the second docking cable provides greater than 100 W of power to the coupled laptop computer.

4. The docking station of claim 1, wherein the main controller is further configured to determine whether the coupled laptop computer supports dual pathway power delivery and further configured to use the first power circuit and the second power circuit for providing power to the laptop computer.

5. The docking station of claim 1, wherein a plug of the first docking cable and a plug of the second docking cable are coupled to form a single docking plug.

6. The docking station of claim 5, wherein the single docking plug comprises a first connector and a second connector that s are received by the adjacent ports of the laptop computer.

7. A method for providing power by a docking station, the method comprising:

receiving, via a DC power connector of the docking station, a power input from an AC power adapter, wherein the DC power connector is coupled to a first power circuit and to a second power circuit;

providing, by the first power circuit, a first power output to the coupled laptop computer;

providing, by the second power circuit, a second power output to the coupled laptop computer; and selecting, by a controller of the docking station, power delivery by the docking station using the first power circuit and the second power circuit, wherein the laptop computer is coupled to the docking station via a first and second docking cables and wherein the docking station routes power from the first power circuit to the laptop computer via the first docking cable and routes power from the second power circuit to the laptop computer via the second docking cable, and wherein first docking cable and the second docking cable are received by adjacent ports of the laptop computer.

8. The method of claim 7, wherein the laptop computer is simultaneously coupled to the docking station via the first docking cable and the second docking cable.

9. The method of claim 8, wherein the simultaneous delivery of power by the first power circuit via the first docking cable and by the second power circuit via the second docking cable provides greater than 100 W of power to the coupled laptop computer.

10. The method of claim 8, further comprising:
   interfacing, by the controller, with the laptop computer to determine whether the laptop computer supports dual-pathway power delivery; and
   when the laptop computer supports dual-pathway power delivery, selecting, by the controller, the first power circuit and the second power circuit for providing the power to the laptop computer.

11. A system comprising:
   a first IHS (Information Handling System) comprising a display, a memory, a storage drive, a processor and a docking interface; and
   a docking station configured for providing power to the first IHS, wherein the docking station comprises:
      a DC power connector that receives a power input from an AC power adapter, wherein the DC power connector is coupled to a first power circuit and to a second power circuit;
      the first power circuit receiving power from the DC power connector and providing a first power output to the first IHS;
      the second power circuit receiving power from the DC power connector and providing a second power output to the first IHS; and
      a controller configured to determine whether to deliver power to the first IHS using the first power circuit and the second power circuit, wherein the laptop computer is coupled to the docking station via a first and second docking cables and wherein the docking station routes power from the first power circuit to the laptop computer via the first docking cable and routes power from the second power circuit to the laptop computer via the second docking cable, and wherein first docking cable and the second docking cable are received by adjacent ports of the laptop computer.

12. A system of claim 11, the first docking cable and the second docking cable are simultaneously coupled to the first IHS.

13. The system of claim 12, wherein the simultaneous delivery of power by the first power circuit via the first docking cable and by the second power circuit via the second docking cable provides greater than 100 W of power output to the first IHS.

\* \* \* \* \*